No. 682,361. Patented Sept. 10, 1901.
W. R. KEITH.
CLEVIS.
(Application filed Oct. 15, 1900.)

(No Model.)

Witnesses:
G. L. Alderson
W. E. Andrews

Inventor:
W. R. Keith

United States Patent Office.

WILLIAM R. KEITH, OF COALCREEK, TENNESSEE.

CLEVIS.

SPECIFICATION forming part of Letters Patent No. 682,361, dated September 10, 1901.

Application filed October 15, 1900. Serial No. 33,117. (No model.)

*To all whom it may concern:*

Be it known that I, WILLIAM R. KEITH, a citizen of the United States, residing at Coalcreek, in the county of Anderson and State of Tennessee, (whose post-office address is Coalcreek, Tennessee,) have invented a New Style of Clevis, of which the following is a specification, reference being had to the accompanying drawings, forming part thereof.

Figure 1:
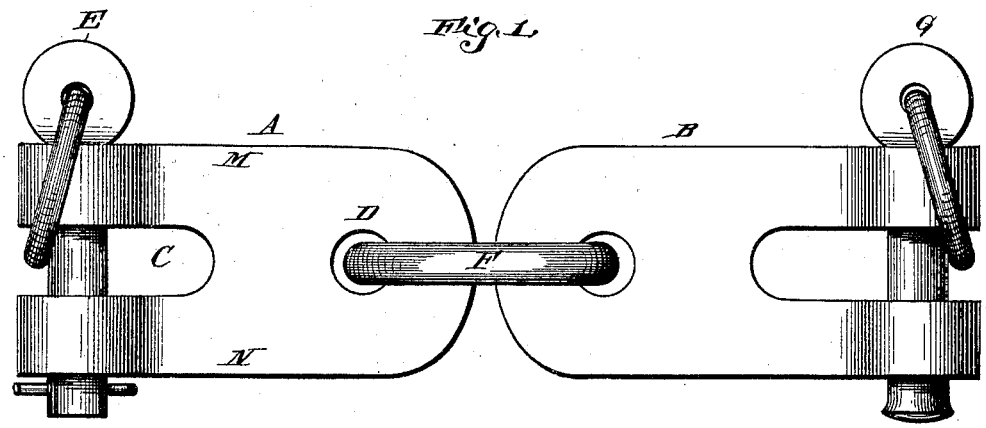
Figure 2:
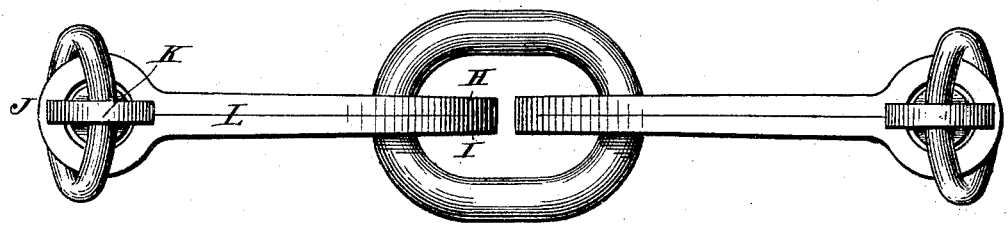

Figure 1 is a side view of two of the clevises connected together by an ordinary link in the center and with the perpendicular pin in each end. Fig. 2 shows a top view of two of the clevises formed into a mine-car coupling.

The two clevises A and B, Fig. 1, are exactly alike.

The most desirable mode of manufacturing the clevis is by casting it in the foundry of desirable material, or it may be made in the ordinary blacksmith-shop by taking a piece of iron or steel, say, four inches broad, one-half inch thick, and fifteen inches long. Take a cleaver and round the four corners. Then cut out a slot exactly in the center of the piece of material about seven inches long and one and one-fourth inches wide. Thoroughly heat the piece of material in the center or the neighborhood of J, Fig. 2. Fold the ends together, as shown at H and I, Fig. 2, shrinking the material over a mandrel at K, where the pin is to be inserted, thoroughly welding the line L. Bore or punch a hole one and one-half inches in diameter at D, Fig. 1, and insert a pin E or G, as desired, which will make the clevis complete, ready to be attached to a derrick, hoist, mine-car coupling, or anything else that may be desired.

The leading or material feature of my invention is the simple construction and the enormous strength and durability it possesses over the ordinary clevis and the safety to life and property therefrom. The solid material across the clevis from M to N, Fig. 1, will not allow it to spread, and the narrow space C gives the pin E or G, Fig. 1, a much-needed strength, as simplicity, strength, and durability are the characteristics of the invention.

The pins E and G and the link F, Fig. 1, are not claimed in this petition as new, for they have been in general use for a number of years.

What I claim as my invention, and desire to secure by Letters Patent, is—

A clevis comprising a plate A provided with a slot C, cut from the center thereof, having the corners of the said plate rounded and bent upon itself, thus forming an opening for the headed pin E, the other end of the clevis being provided with an opening through which passes a link F by means of which it is pivoted to another clevis identical in form to the one described, as and for the purpose described.

W. R. KEITH.

Witnesses:
C. A. WARTERS,
R. S. ALLISON.